R. I. BATZ.
POULTRY FOUNTAIN.
APPLICATION FILED NOV. 26, 1912.
1,062,531.
Patented May 20, 1913.
2 SHEETS—SHEET 1.
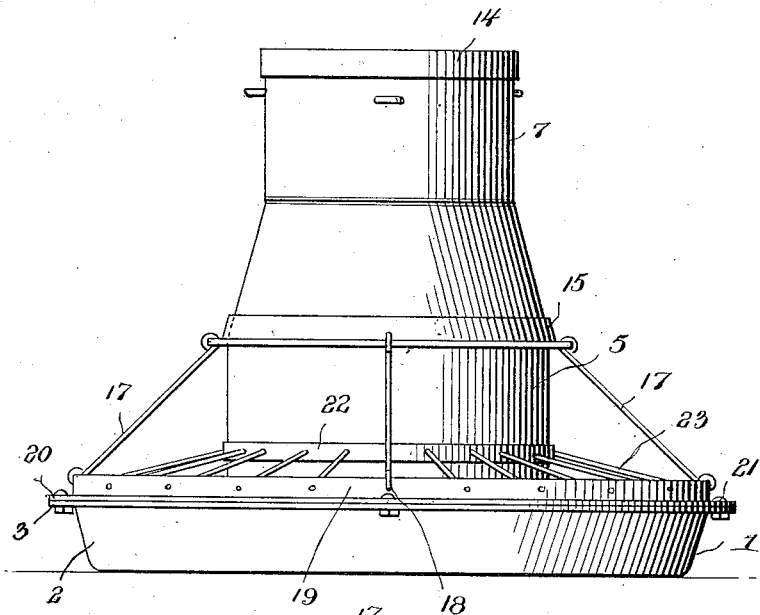
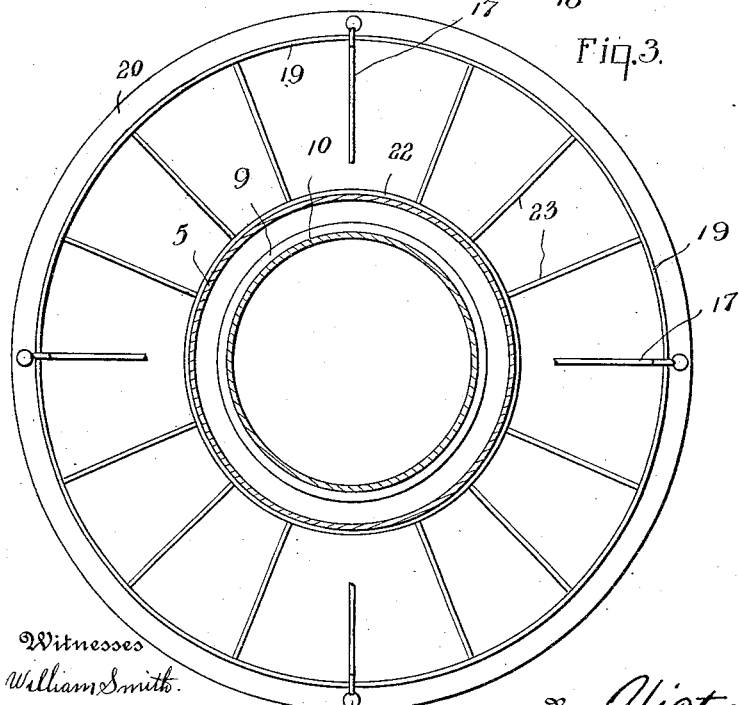
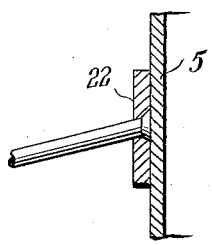
Witnesses
William Smith.
John J. McCarthy
Inventor
R. I. Batz.
By Victor J. Evans
Attorney

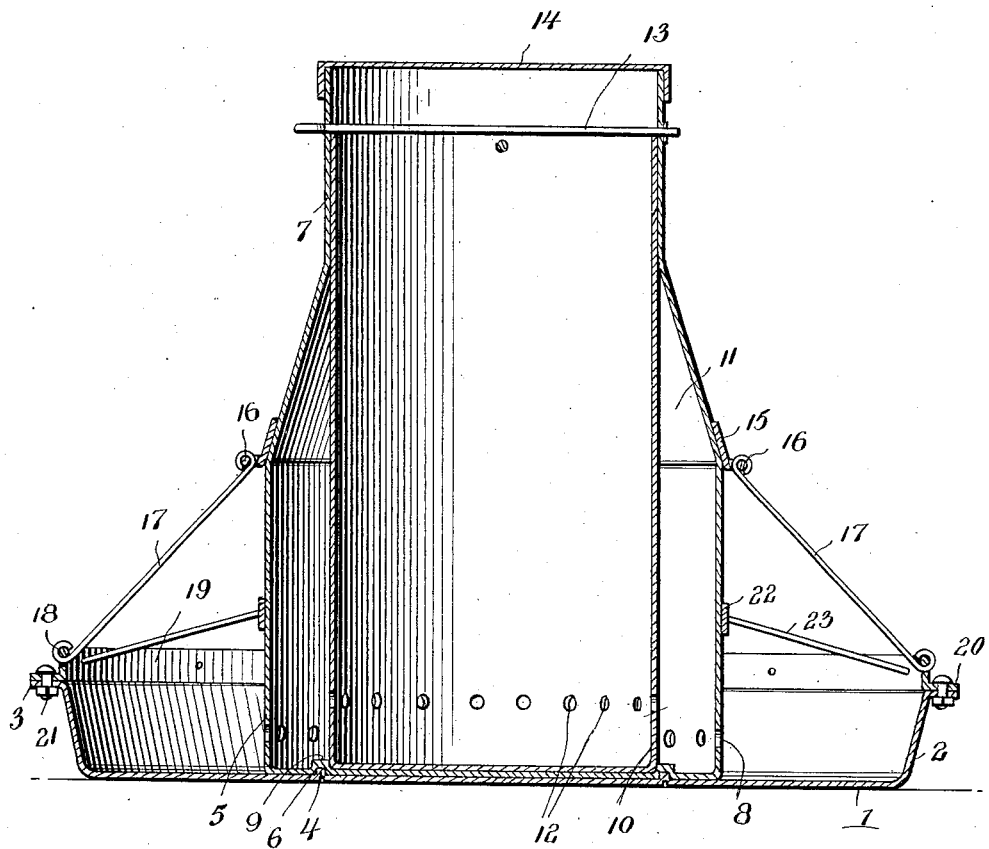

UNITED STATES PATENT OFFICE.

ROSE I. BATZ, OF PITTSFIELD, ILLINOIS.

POULTRY-FOUNTAIN.

1,062,531.  Specification of Letters Patent.  Patented May 20, 1913.

Application filed November 26, 1912. Serial No. 733,655.

*To all whom it may concern:*

Be it known that I, ROSE I. BATZ, a citizen of the United States of America, residing at Pittsfield, in the county of Pike and State of Illinois, have invented new and useful Improvements in Poultry-Fountains, of which the following is a specification.

This invention relates to improvements in poultry fountains and has particular application to fountains of that class wherein the water is fed automatically from the container to the drinking pan and in accordance with the amount of water in the pan.

In carrying out the present invention, it is my purpose to provide a drinking fountain which will be found especially useful for poultry and wherein the water within the water container will be maintained cool and out of contact with the heat in warm weather.

It is also my purpose to provide a poultry fountain possessing the desired features of simplicity, efficiency and durability coupled with economy of cost in manufacture and marketing and which is conducive to sanitation.

With the above and other objects in view, the invention consists in the construction, combination and arrangement of parts hereinafter set forth in and falling within the scope of the claim.

In the accompanying drawings: Figure 1 is a perspective view of a poultry fountain constructed in accordance with my present invention. Fig. 2 is a vertical central sectional view of the fountain. Fig. 3 is a transverse horizontal sectional view of the same, and Fig. 4 is a detail view of the guard detached from the fountain.

Referring now to the accompanying drawings in detail, the numeral 1 indicates the drinking pan constructed of any suitable material and provided with an upstanding circular marginal wall 2 having an outturned circumferential flange 3, and an upstanding annular rib 4 at the center thereof. A receptacle 5 is disposed in the center of the pan and has an annular groove 6 formed in the bottom thereof to receive the rib 4 so as to eliminate shifting of the receptacle within the pan. This receptacle 5 is provided with a restricted open top portion 7 and has its side wall provided with an annular series of discharge orifices 8 which establish communication between the interior of the receptacle and the pan 1, the discharge orifices being arranged in a plane below the upper edge of the marginal wall 2 of the pan. Formed on the inner surface at the bottom of the receptacle and extending upwardly therein is an annular rib 9. Mounted within the receptacle 5 and resting upon the bottom thereof inwardly of the rib 9 is a relatively small water container 10 designed to hold a quantity of water and spaced apart from the side wall of the receptacle 5 whereby an air space 11 is provided. By means of this air space, the heat is prevented from contacting with the walls of the receptacle 10 and consequently the water within such receptacle is kept comparatively cool. This water container has formed in the side wall thereof an annular row of discharge orifices 12 suitably spaced apart and designed to establish communication between the water container and receptacle 5 and these discharge orifices are preferably arranged in a plane above that of the similar orifices in the side wall of the receptacle and approximately coincident with that of the upper edge of the marginal wall 2 of the pan 1. From this construction, it will be seen that the water within the container 10 is first discharged into the receptacle 5 and then flows from the receptacle by way of the discharge orifices therein into the pan 1, the level of the water within the pan regulating the flow from the receptacle, while the level of the water within the receptacle controls the water flowing from the container. The restricted top portion of the receptacle 5 is preferably formed with diametrically alining openings through which are passed a rod 13, the latter serving as a bail or handle for lifting the receptacle and water container out of the pan and also acting as a stop to prevent accidental dislodgment of the container from the receptacle. A suitable cap 14 is employed to close the top of the receptacle and water container.

In order to securely hold the receptacle and water container within the pan when the fountain is assembled, I employ, in the present instance, an annulus 15 suitably fastened to the receptacle 5 at the junction of the side wall and the restricted top portion thereof and provided with a series of eyes 16 suitably spaced apart and each receiving one end of a brace rod 17, the opposite ends of the brace rod being passed through eyes 18 formed in a ring 19 having an attaching flange 20 bolted as at 21 to the flange 3 on the upper edge of the marginal wall 2 of the pan.

To prevent the fowl from wading in the pan, a suitable guard is employed which, in the present embodiment of my invention, comprises the ring 19 carried by the flange on the marginal wall of the pan, and a second ring 22 secured to the side wall of the receptacle 5 and disposed in a plane above that of the ring 19, wires 23 spanning the space between the said rings and are inclined downwardly and outwardly of the receptacle, incident to the relative positions of the rings. These wires 23 are spaced apart sufficient distances to enable the fowl to drink with ease and facility.

From the foregoing description taken in connection with the accompanying drawings, the construction and manner of employing my invention will be readily apparent. It will be seen that I have provided a drinking fountain for poultry or the like wherein the water is kept cool and which avoids the disadvantages heretofore present in this class of fountains, incident to the fowl wading within the water in the pan.

While I have herein shown and described one preferred form of my invention, it is to be understood that I do not limit or confine myself to the precise details of construction herein described and delineated, as modification and variation may be made within the scope of the claim and without departing from the spirit of the invention.

I claim:

A drinking fountain comprising a pan having an upstanding marginal wall, and an upstanding annular rib at the center portion thereof, a receptacle disposed in the center of said pan and having a groove formed in the under surface of the bottom thereof to receive said rib, and an annular rib on the inner surface of the bottom thereof, said receptacle having a restricted open top and provided with discharge orifices opening into said pan, a relatively small water container mounted within said receptacle and resting upon the bottom thereof inwardly of said last-named rib, said container being spaced apart from the side wall of said receptacle, whereby an air space is formed, and having discharge orifices opening into said receptacle, and a cap closing the open ends of said receptacle and water container.

In testimony whereof I affix my signature in presence of two witnesses.

ROSE I. BATZ.

Witnesses:
H. S. MILLER,
LILLY A. SCHAFER.

---

Copies of this patent may be obtained for five cents each, by addressing the "Commissioner of Patents, Washington, D. C."